April 11, 1950  O. O. McBRIDE  2,503,628
POWER FACTOR INDICATOR

Filed Oct. 23, 1946  4 Sheets-Sheet 1

INVENTOR.
OCTAVE O. MCBRIDE
BY *Victor J. Evans & Co.*
ATTORNEYS

April 11, 1950     O. O. McBRIDE     2,503,628
POWER FACTOR INDICATOR

Filed Oct. 23, 1946     4 Sheets-Sheet 2

*INVENTOR.*

OCTAVE O. MC BRIDE
BY *Victor J. Evans & Co.*

ATTORNEYS

April 11, 1950     O. O. McBRIDE     2,503,628
POWER FACTOR INDICATOR
Filed Oct. 23, 1946     4 Sheets-Sheet 3
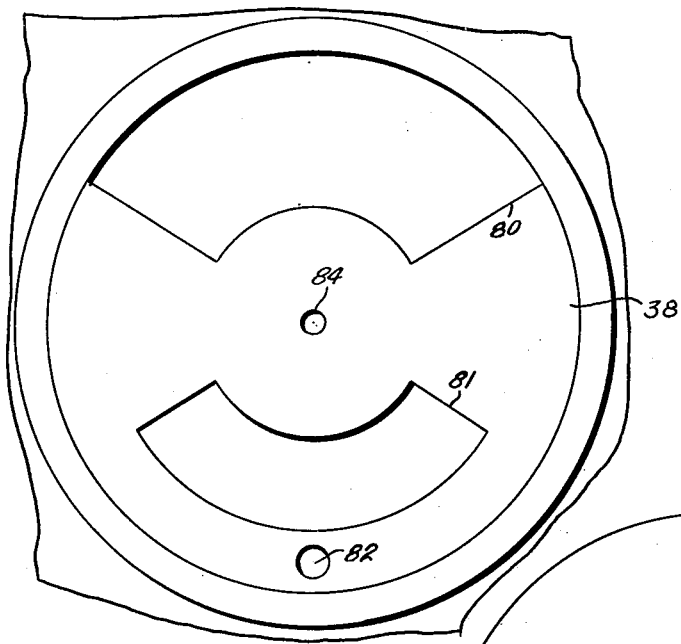
FIG. 3.
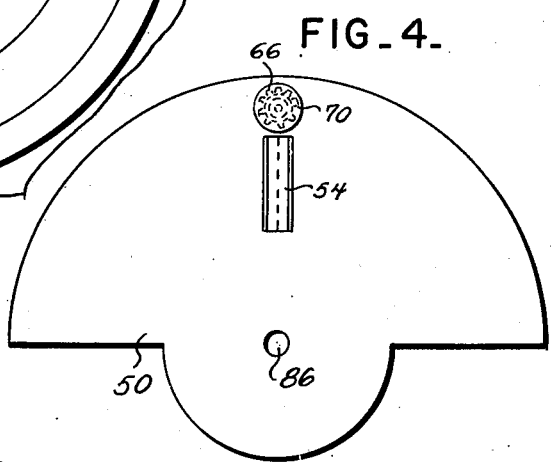
FIG. 4.
FIG. 5.
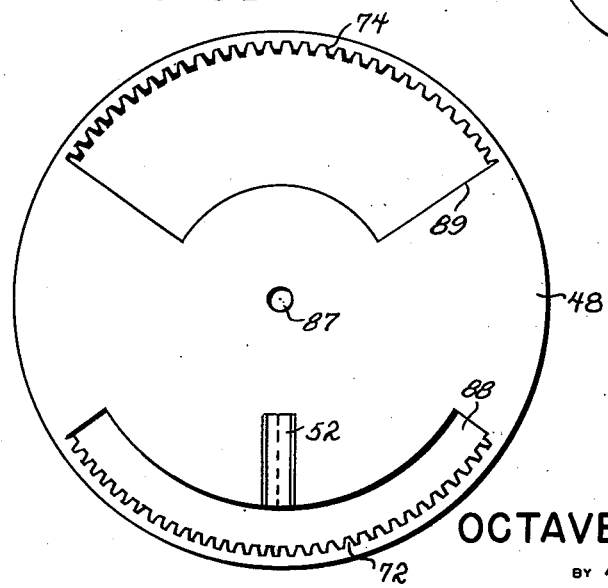
INVENTOR.
OCTAVE O. McBRIDE
BY *Victor J. Evans & Co.*
ATTORNEYS April 11, 1950  O. O. McBRIDE  2,503,628
POWER FACTOR INDICATOR
Filed Oct. 23, 1946  4 Sheets-Sheet 4
FIG_6_
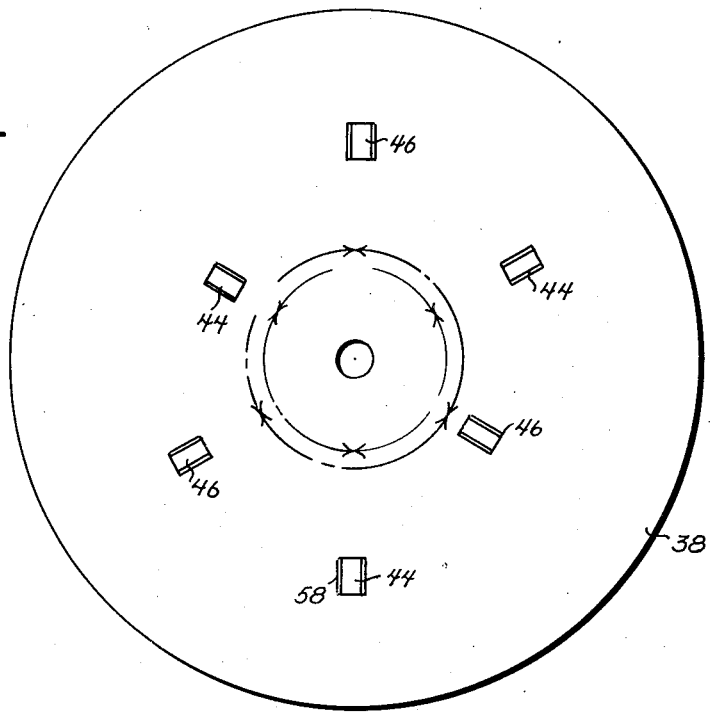
FIG_7_
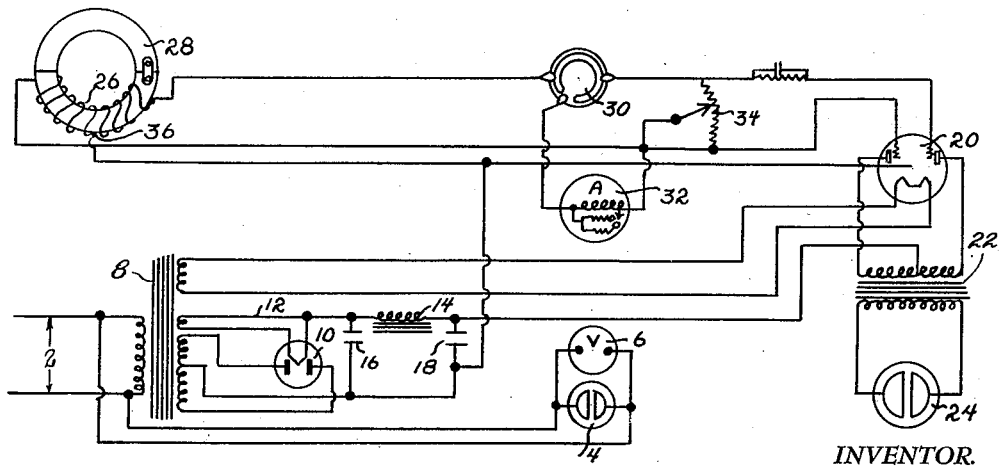
INVENTOR.
OCTAVE O. MC BRIDE
BY *Victor J. Evans & Co.*
ATTORNEYS Patented Apr. 11, 1950

2,503,628

UNITED STATES PATENT OFFICE 2,503,628

POWER FACTOR INDICATOR

Octave O. McBride, Texarkana, Tex.

Application October 23, 1946, Serial No. 705,004

3 Claims. (Cl. 172—245)

My present invention relates to an improved power factor indicator and more particularly to a device for analyzing the operation of an electrical circuit by showing the angle of displacement between the voltage and current. The device may also be employed as a synchronizing instrument and it may be used to analyze a circuit by showing different currents, and the polarity of such currents that might exist in the positive or negative half cycle of an alternating current.

In the accompanying drawings I have illustrated one complete example of the physical embodiment of my invention according to the best mode I have thus far devised, but it will be understood that various changes and alterations may be made in the exemplified structure within the scope of the appended claims.

In the drawings:

Fig. 3 is a plan view of one adjustable dial plate.

Fig. 4 is a plan of the second adjustable dial plate.

Fig. 5 is a plan view of the third adjustable dial plate.

Fig. 6 is a plan of the scanning disk.

Fig. 7 is a diagrammatic view of the electrical circuit employed with my invention.

Figure 1:
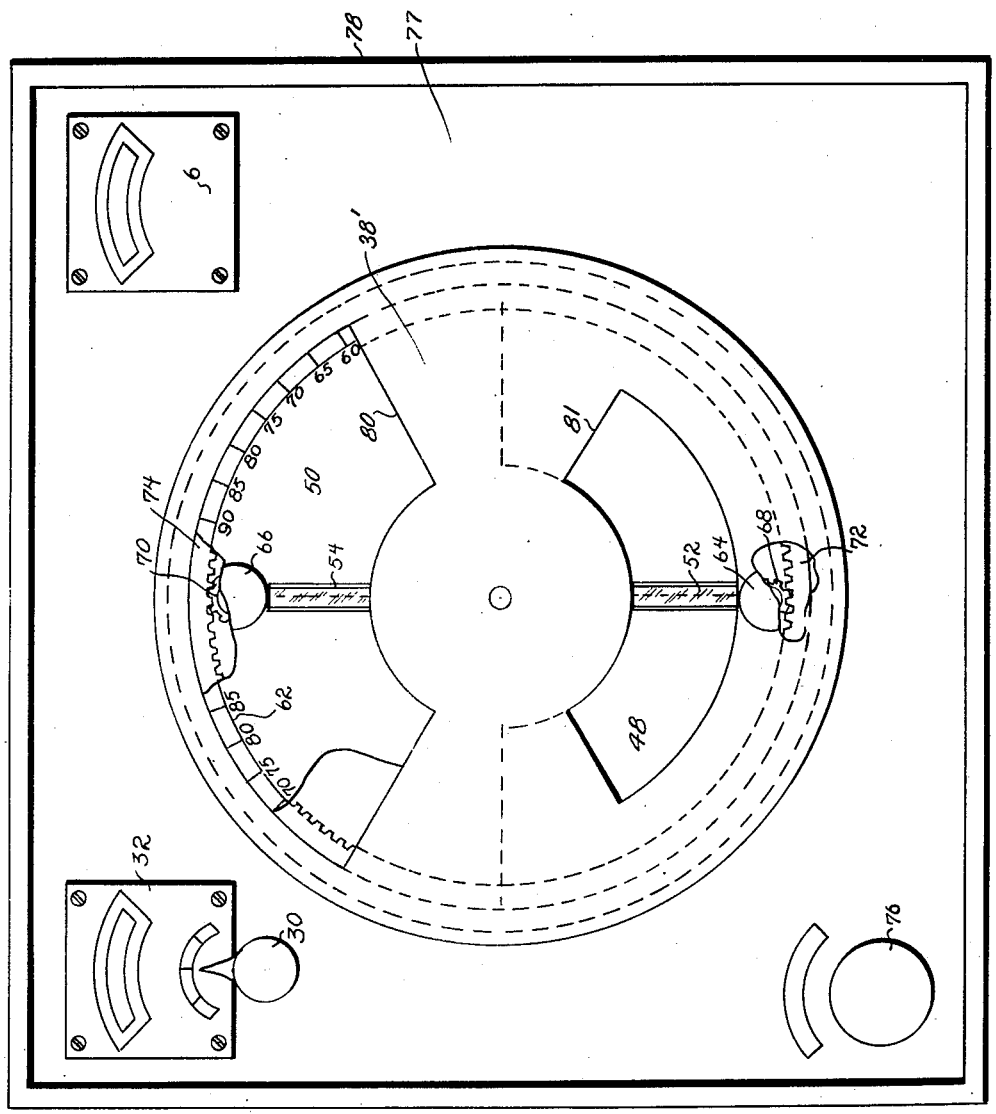
Fig. 1 is a front elevational view of the device partially broken away to show the interior.

Referring now to the drawings, I provide for the circuit a supply source of current 2 to which is connected a potential lamp of neon or other suitable type 4 having a voltmeter 6 connected in parallel therewith.

A transformer 8 has associated therewith a rectifier tube 10 and in the wire 12 I provide a series choke 14 between condensers 16 and 18. The tube 10 is connected with tube 20 provided with a transformer 22 and a neon tube 24.

Connected with the above circuit I provide an exploration coil 26 wound about a split hinged core ring 28 for the purpose of encircling the conductor of the circuit being tested. This affords a path for the magnetic field produced by the current to be brought through the exploration coil, so that the resulting induced current is brought to the grids of the electronic tube 20. A transfer switch 30 is provided to shunt this current through an ampere meter 32. A variable resistor 34 is connected across the circuit so that the input to the tube 20 may be brought to a value that will be in line with the tube capacity. The return of this circuit is through the tube cathode to a center tap 36 on the coil 26, thus getting full wave excitation to the plate circuits. This gives the same sine wave pattern of illuminations from the current indicating lamp as is being made by the magnetic fiield of the circuit under test.

With the current indicating lamp operating in response to the magnetic field as produced by the current in the circuit being tested and the potential indicating lamp operating in response to the voltage of the circuit to which it is connected, the frequency being the same, both lamps would be producing illumination with the same sine wave pattern, but possibly not in unison. The scanning disk 38 operated by motor 40 having a switch 42 and connected with the same circuit as that for the lamp 4 and the voltmeter 6, is brought up to synchronization, or a little off synchronous speed either above or below.

The disk 38 has two sets of windows 44 and 46 being diametrically aligned in pairs but spaced at various radial distances from the center and the windows of the two sets each 120° from the next window. The lamps 4 and 24 are located at opposite sides of the disk and are mounted on their respective sections of the dial plates 48 and 50 above the disk 38, so that when a dial plate section is adjusted the corresponding lamp is alined with the windows in the respective plate sections. The illumination from the lamps 4 and 24 will have a pattern corresponding to the exciting current for the lamps. For example, a neon lamp, if excited from a 60 cycle A. C. current source, will produce 120 periods of illumination, one for each one-half cycle and in between the one-half cycle illumination period, the lamp actually goes dark. This occurs, of course, at a rate faster than the human eye can detect, but by viewing this lamp through an aperture in a revolving disc, a stroboscopic view of any part of the cycles of illumination can be seen.

The apertures 44 and 46 are used, therefore, to produce this effect. Through these apertures, and the windows in the adjustable plates above the revolving disc, any part of the cycles of illumination can be brought to a fixed point. If the speed of the disc is not synchronized or revolving at an off-synchronous speed, the illumination of the lamps is viewed through different apertures, as the disc revolves. As this is undetectable to the human eye, it appears as a beam of light the full length of the windows with the prisms in the top plates. Therefore, should the speed of the disc be changed, to revolve at a synchronous speed, then the illumination appears through the same window on each revolution of the disc.

Since each aperture of a set is spaced different distances from the center of the disc, this arrangement permits the determination of the phase sequence of a three or polyphase circuit. This determination is made by noting the order in which the illumination of the apertures appears in different windows when the exploration coil is shifted from one phase to another.

The dial plates 38', 48 and 50 are adjustable through the medium of knobs 64 and 66. If an adjustment is desired to be made to view some part of the cycles of the voltage indicating lamps, both sections are moved simultaneously through the use of one knob. This voltage indication setting is retained in this position, and the adjustor on the plate section for current indication is used to move that section only. Therefore, when both sections are adjusted to the corresponding part of the cycle, then the displacement between voltage and current will be indicated on the scale.

In order to set the dials at the peak of illuminating impulses, reflectors 58 are mounted on each side of the windows in the disk and the prisms in the dial plates are divided into two elongated sections.

This allows the operator to center prisms over peak of illumination, as an off-center location of prism produces a section with a different amount of illumination. During the time that the visible rays are being produced on each half cycle the disc will have traveled some distance, so in order to better find the location of peak illumination, this arrangement of reflectors and dual section prism is utilized. When the disc is brought up to synchronous speed, the dial plate is adjusted to peak illumination of the potential indicating lamp, the section of dial plate containing the prism for current indicating lamp is then adjusted for peak illumination; the pointer 60 on the current section of dial plate will indicate on the scale 62 marked off on the potential section, the degree of displacement, or power factor per cent.

Adjustment of the dial plate sections is made through the knob 64 and 66 having pinions 68 and 70 in engagement with the segmental racks 72 and 74.

A knob 76 is provided for the variable resistor 34 so that the input to tube 20 may be adjusted.

Figure 2:
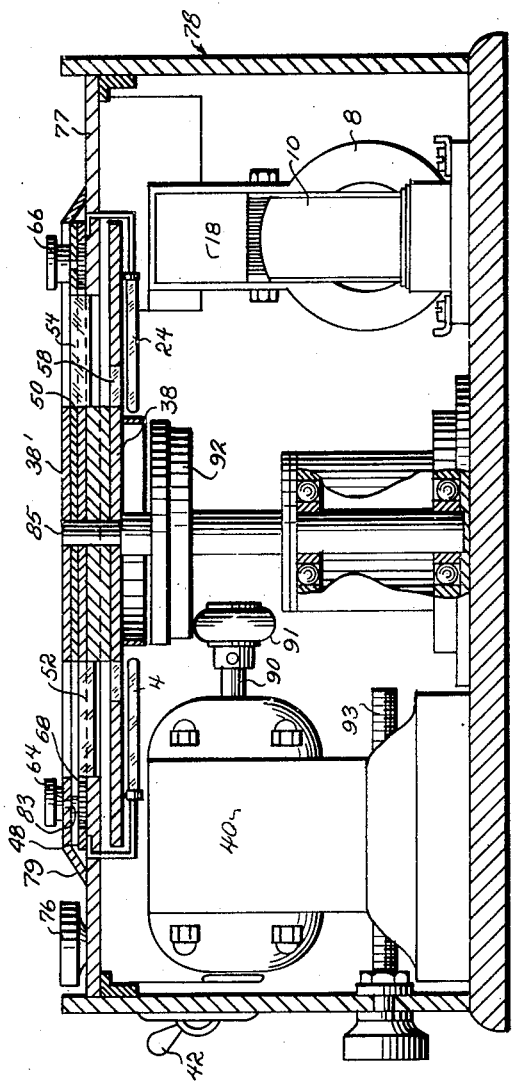
Fig. 2 is a vertical sectional view at line 2—2 of Fig. 1.

In viewing Figure 2 it will be seen that the dial plate 38' is mounted on the top cover 77 of a housing 78 for the device and the plate 38' is supported in elevated relation to the cover 77 by means of the annular inclined flange 79. The dial plate 38' is provided with the arcuate shaped scanning cut-outs 80 and 81 respectively and the plate 38' carries the knob 64. The pinion 68 carried by the knob 64 meshes with the gear track 72 in the plate 48, and the plate 38' is provided with the opening 82 for passage therethrough of the shaft 83 for the knob 64, centrally of the plate 38' there is provided an opening 84 to receive the upper end of the shaft 85.

Positioned directly below the plate 38' is the plate 50 which is shaped as shown in Figure 4 and carries the knob 66, the plate 50 has a central opening 86 to receive the shaft 85 and it will be noted that the plate 50 carries the prism 54 between the knob 66 and the central opening 86 as shown in Figure 2. The plate 50 carries the current indicating lamp 4 and the lamp is mounted below the spinning disk 38 in alinement with the prism 54 with the spinning disk 38 between the lamp and the prism 54. Through the adjustment of the knob 66 a stroboscopic view can be had of any part of the sine wave patterns of illumination or the inner shadow which comes between the half cycle thus the plate 50 is adjusted with relation to the plate 38' through the medium of the knob 66 which co-acts with the rack 74 carried by the plate 48 which is mounted directly below the plate 50. The plate 48 is provided with the central opening 87 to receive the shaft 85, and this plate also carries the rack 72 which meshes with the pinion 68 on the knob 64, and this plate as seen in Figure 5 also carries the prism 52 between the scanning arcuate shaped cut out 88, one edge of the disk 48 forms the rack 72, and the rack 74 forms one side of the arcuate shaped scanning cut out 89 in the plate 48 and the prism 52 will be positioned below the scanning cut out 81 in the plate 38'. The adjustment of the plate 48 through means of the knob 64 will also cause plate 50 to be adjusted through the medium of the gear pinion 70 mounted on the shaft of the knob 56 meshing with the rack of said knob. Therefore by holding one knob stationary the plates can be adjusted simultaneously. The plate 48 carries the current indicating lamp 24 directly below the prism 52, and when both plates are properly adjusted the power factors can be read as indicated by the scale 62 on the plate 50.

In addition to being a power factor indicator as outlined in the previous description this device can also be used as a synchronized instrument for connecting circuits together which are being supplied by separate sources, another use of this instrument is indicating the phase sequence which is in the order in which one phase follows another. In operating the device as a power factor indicator the unit is connected to a suitable source of power 2 for operating the potential lamp 4 and current indicating lamp spring disk 38 and the motor 40. Viewing Figure 2 it will be noted that the motor shaft 90 carries a friction wheel 91 which engages with a disk 92 fixed to the shaft 85 and the disk 38 is likewise fixed through the shaft 85 so that operation of the motor will cause rotation of the disc 38. The power supply 2 serves to furnish filament and D. C. plate voltage to the amplifier and the scanning disk motor connection being connected with the same circuit with the potential lamps and a voltmeter with a switch for individual control of the motor as shown at 42. The extension or expiration coil affords a path for the magnetic field produced by the current to be brought through the expiration coil, the resulting induced current is brought to the grids of the tubes 4 and 24 and a transfer switch is provided to shunt this current through the ampere meter 32. A variable resistor 34 is connected across the circuit so that the input to the tube may be brought to a value that will be in line with the tube capacity. The return of this circuit is through the tube cathode to a center tap on the exploration coil, thus getting the full wave excitation to the plate circuits. This gives the same sine wave pattern of illuminations from the current indicating lamp 24 as is being made by the magnetic field of the circuit under test. When the disk 38 rotates the light from the lamps 4 and 24 will appear at one window of the set of windows on the disk and will illuminate that prism positioned above the windows. If in the prism on the opposite side of the dial plate the light appears in a different related window or prism section it will indicate a further displacement of 120° or 240° determined by the related windows in which the light appears. This explains the operation of this device phase sequence indicator. If the speed of the disk be increased or decreased from synchronous speed the light will appear as oscillating from one end of the scanning cut out over the prisms to the other by appearing through each window of the disk 38 separately in consecutive order. Then by setting the dial section where the oscillations are in unison the power factor can be read on the scale 62 on the dial 50. If the speed of the disk be brought to a harmonic speed such that illumination impulses can be brought to each of the three windows in order and the full length of the prism will be illuminated in the same procedure as above in locating the center. If the speed be increased or decreased from this point the light will appear to fade and go out at regular intervals, and when the fading of one is synchronized with the other prism the power factor will be indicated by the pointer.

When using the instrument for synchronizing purposes the potential indicating circuits are connected to one source as in the other tests and the extension coil is placed in the field of the circuit to be tied-in and proceed as above described for the power-factor tests.

The device therefore consists of two gaseous lamps 4 and 24 such as neon or any lamp that is capable of producing visible rays which form the same sine wave pattern as the voltage applied to it. One can be identified as the voltage or potential indicator, the other as the current indicator, and are located below the rotating disk 38, this disk has windows so spaced that when rotated at proper speed the windows will be in position of synchronization with the cycles of illumination of the lamps, above the scanning disk 38 are the plates 38', 48 and 50 respectively, and these disks are so constructed that one adjustment actuates both sections while the other adjustments control only one section. The lamps 4 and 24 are mounted to their respective sections as above described and can be brought to such a position as to permit the illumination of the lamps to become visible through the dial plate and the scanning cut outs in the plates 38' and 48, the two prisms are mounted to aid in adjusting for the peak of illumination and as previously described the power for rotating the spinning disk is transferred by means of the friction coupling from the electric motor which is mounted within the housing 78 and the screw 93 coacts with the motor to enable changing the ratio of the drive coupling. The potential indicating lamp is excited by being connected to the supply current, the current indicating lamp is connected to the secondary winding of the transformer the primary of which is connected in series with the plate circuit of the amplifier tube, the grid of this tube being excited from the extension coil which is so constructed that it can be placed in the magnetic field of the circuit to be tested. The source of the direct current power for the plate circuit is obtained from a suitable rectifier and filter, thus the purpose of this invention is to enable the operator to determine a definite relation between the voltage and current of an alternating current circuit.

Having thus fully described my invention what I claim as new and desire to secure by Letters Patent is:

1. A power factor indicator comprising a lamp responsive to current phases of a current source, a lamp illuminated by excitation from a second current, rotary scanning means in front of said lamps, and a plurality of adjustable dial plate sections mounted in front of said rotary scanning means and certain of said dial plate sections each carrying one of said lamps, said dial sections with their respective lamps being movable to synchronize the illuminated lamp current phases, and indicating means on the other of said plate sections for indicating the lead or lag of the current phases.

2. A power factor indicator as in claim 1 wherein said lamps are of a gaseous form and said rotary scanning means is provided with alined windows for each of said lamps, certain of said dial plates carrying prisms adapted to be alined with said windows and certain of said dial plates carrying scanning cut-outs to view said prisms and said windows.

3. A power factor indicator as in claim 1 wherein certain of said plate sections carry means for adjusting the relation of said plate sections to each other.

OCTAVE O. McBRIDE.

REFERENCES CITED

The following references are of record in the file of this patent:

UNITED STATES PATENTS

| Number | Name | Date |
|---|---|---|
| 1,251,669 | Jensen | Jan. 1, 1918 |
| 1,454,713 | Elverson | May 8, 1923 |
| 1,918,068 | Singer | July 1, 1933 |
| 1,936,774 | Sparkes | Nov. 28, 1933 |
| 1,964,776 | Zuschlag | July 3, 1934 |
| 2,114,714 | Kalsey | Apr. 19, 1938 |